United States Patent
Keramidas et al.

(10) Patent No.: US 7,217,408 B2
(45) Date of Patent: May 15, 2007

(54) SOLUBILISATION OF CARBONATES BY RECYCLING CONDENSATES DURING DIGESTION OF MONOHYDRATE BAUXITES UNDER PRESSURE

(75) Inventors: Odissefs Keramidas, Aix en Provence (FR); Jean-Michel Lamerant, Bouc-Bel-Air (FR); Raymond Roumieu, Aix en Provence (FR)

(73) Assignee: Aluminium Pechiney, Paris (FR)

( * ) Notice: Subject to any disclaimer, the term of this patent is extended or adjusted under 35 U.S.C. 154(b) by 240 days.

(21) Appl. No.: 10/499,812

(22) PCT Filed: Jan. 17, 2003

(86) PCT No.: PCT/FR03/00139

§ 371 (c)(1),
(2), (4) Date: Jan. 13, 2005

(87) PCT Pub. No.: WO03/062147

PCT Pub. Date: Jul. 31, 2003

(65) Prior Publication Data

US 2005/0123460 A1    Jun. 9, 2005

(30) Foreign Application Priority Data

Jan. 21, 2002   (FR)   .................. 02 00717

(51) Int. Cl.
*C01F 7/02*        (2006.01)
*C01F 7/20*        (2006.01)
(52) U.S. Cl. ..................... 423/625; 423/111; 423/121; 423/122
(58) Field of Classification Search ............... 423/625, 423/111, 121, 122
See application file for complete search history.

(56) References Cited

U.S. PATENT DOCUMENTS 3,560,148 A    2/1971    Tamise et al.

(Continued)

FOREIGN PATENT DOCUMENTS

DE    1132898    7/1962

(Continued)

OTHER PUBLICATIONS

The English abstract of FR 2,328,660 A published on Jun. 24, 1977.*

(Continued)

*Primary Examiner*—Timothy C. Vanoy
(74) *Attorney, Agent, or Firm*—Dennison, Schultz & Macdonald

(57) ABSTRACT

A method for the production of aluminum from bauxites containing aluminum monohydate of the diaspore or boehmite type which may contain more than 1.5% by weight of calcium carbonates. The ore is digested by producing feeding a suspension produced from milled bauxite ore and concentrated aluminate liquor to a plant with a series of autoclaves and a series of regulators supplying tubular reheaters across the autoclaves with steam. The suspension first travels across the series of autoclaves, and on exiting, the digestion of the ore is practically complete, and the suspension then travels across the series of regulators. The condensation water from the steam coming from the regulator and feeding the reheater is collected in a purge pot. Within the series of regulators, the suspension is diluted on entering a regulator with the water coming from the condensation of the steam from one or several upstream regulators.

8 Claims, 3 Drawing Sheets

U.S. PATENT DOCUMENTS

| | | | |
|---|---|---|---|
| 4,101,629 A | 7/1978 | Mercier et al. | |
| 6,814,873 B2 * | 11/2004 | Spitzer et al. | 210/698 |
| 2001/0012498 A1 | 8/2001 | Lamerant | |

FOREIGN PATENT DOCUMENTS

| | | |
|---|---|---|
| DE | 1202258 | 10/1965 |
| EP | 652181 | 5/1995 |

OTHER PUBLICATIONS

The English abstract of FR 2,758,544 A1 published on Jul. 24, 1998.*

* cited by examiner

SOLUBILISATION OF CARBONATES BY RECYCLING CONDENSATES DURING DIGESTION OF MONOHYDRATE BAUXITES UNDER PRESSURE

This application is a filing under 35 USC 371 of PCT/FR2003/000139 filed Jan. 17, 2003.

FIELD OF THE INVENTION

The invention relates to an alumina production process according to the Bayer process from bauxites containing alumina monohydrate of the diaspore or boehmite type, such as Greek and Chinese bauxites, which may contain more than 1.5% by weight of calcium carbonates.

DESCRIPTION OF RELATED ART

The Bayer process forms the main technique for the production of alumina to be transformed into aluminium by igneous electrolysis (called "metallurgical" alumina). It may also be used to manufacture a large proportion of aluminas intended for the production of refractory materials, ceramics, grinding media, thermal insulation fillers, concretes, etc. (called "non-metallurgical" aluminas). According to this process, the bauxite ore is treated while hot using an aqueous solution of sodium hydroxide of an appropriate concentration, thus causing solubilisation of the alumina and giving a liquor supersaturated with sodium aluminate (pregnant liquor).

The liquor must be raised to a high enough temperature to dissolve the alumina contained in the monohydrate bauxites: more than 220° C., and even up to 250° C. to 270° C. The ore must be digested in autoclaves capable of resisting high pressures, typically several tens of bars. After separation of the solid phase that makes up the undigested residue (red mud) of the ore, the liquor supersaturated with sodium aluminate is crystallised by seeding with aluminium trihydroxide particles in order to cause precipitation of the alumina in solution in the form of aluminium trihydroxide. The sodium aluminate liquor, depleted in alumina after crystallisation (spent liquor), is then recycled to digest the bauxite after being reconcentrated to an appropriate content of sodium hydroxide (addition of hydroxide and/or evaporation).

Since the Bayer process is cyclic, any impurity derived from bauxite and introduced into the liquor during digestion of the ore could accumulate if it is not periodically eliminated. This is the case particularly for sodium carbonate in solution in the Bayer liquor, for which the proportion by weight expressed by the ratio (carbonated $Na_2O$)/(caustic $Na_2O$+carbonated $Na_2O$) must generally be approximately 10% (caustic $Na_2O$ being free $Na_2O$+$Na_2O$ in the form of aluminate $AlO_2Na$ in solution). Above a threshold of about 14%, sodium carbonate can precipitate unexpectedly and reduce the productivity of the Bayer line installations. This is the case particularly for flash tanks in the hot high pressure digestion equipment for bauxites rich in alumina monohydrate.

FIG. 1 shows part of the installation of a Bayer circuit according to prior art, corresponding to a continuous digestion workshop of bauxites with alumina monohydrates: bauxite (bx), when ground (grinder B) and in the presence of an aliquot (L1) of the green liquor, forms a paste that is mixed with the remainder of the green liquor (L2). The slurry resulting from the mix is pumped by powerful pumping means through a series of n mechanically stirred digesters ($A_1$, . . . , $A_{k-1}$, $A_k$, $A_{k+1}$, . . . , $A_n$) followed by a series of m flash tanks ($D_1$, . . . , $D_{i-1}$, $D_i$, $D_{i+1}$, . . . , $D_m$) where m is less than n, before reaching the dilution station (C) then the settlement station at atmospheric pressure (F).

As the slurry passes through each digester $A_k$, it circulates close to a tubular heater ($R_k$) that passes through the digester ($A_k$). The first m tubular heaters ($R_1$, . . . , $R_{k-1}$, $R_k$, $R_{k+1}$, . . . , $R_m$) are supplied by steam retrieved from the flash tanks ($D_m$, . . . , $D_{i+1}$, $D_i$, $D_{i-1}$) and the next (m–n) tubular heaters ($R_{m+1}$, . . . , $R_n$) are supplied by live steam (V) from the heating plant. The temperature reached by the slurry at the output from each digester ($A_k$) is fixed in advance and is controlled by varying the steam quantity ($V_i$) output from a flash tank ($D_i$) and passing through the heater ($R_k$). There is a state associated with each flash tank through which the slurry passes, characterised by an average pressure level and temperature range which are relatively stable over time. Industrial installations comprise a variable number n of digesters and a variable number m of flash tanks. A few years ago, n was typically close to 10 and m was close to 7; at the moment the values are approximately 20 for n and 12 for m.

The duration of the path followed by the slurry is such that the ore is completely digested at the exit from the last digester ($A_n$), where the temperature is close to 260° C., in other words most of the alumina contained in the bauxite is dissolved in the aluminate liquor. The slurry is then directed towards a series of flash tanks ($D_1$, . . . , $D_{i-1}$, $D_i$, $D_{i+1}$, . . . , $D_m$), each flash tank $D_i$ releasing steam $V_i$ supplying a heater $R_k$ described above. At the exit from the last flash tank ($D_m$), the slurry is carried towards a station (C) where it is diluted before being sent to settlement tanks (F) for separation of insoluble residues. The condensation water from steam (Vi) output from the flash tank ($D_i$) passing through the heater ($R_k$) to heat the slurry in the digester ($A_k$) is collected in a purge pot ($P_k$). Uncondensed steam (V'i) is connected to the steam supply ($V_{i+1}$) of the heater ($R_{k-1}$), and the condensate (Ei) contained in the purge pot ($P_k$) is directed to the purge pot ($P_{k-1}$). Water output from the purge port ($P_l$), called alkaline condensates (EDS) is used as industrial water, particularly for washing insoluble residues extracted by settlement in the next workshop (F).

Monohydrate bauxites of the diaspore or boehmite type encountered frequently in Greece and in China are particularly rich in calcium carbonate ($CaCO_3$>1.5%). During digestion, a large increase in the content of sodium carbonate is observed due to the addition of $CO_3^{2-}$ ions released during the dissociation of $CaCO_3$. This content of carbonates in the aluminate is usually higher than the content due to the addition of carbonates alone into the bauxite, since lime is added to improve the digestion efficiency, and the lime used itself includes some calcium carbonate particles, often for economic supply reasons.

Therefore, if the proportion by weight expressed by the (carbonated $Na_2O$)/(caustic $Na_2O$+carbonated $Na_2O$) ratio exceeds a threshold of about 14% (which depends particularly on the temperature of the liquor and its concentration in caustic Na2O), the sodium carbonate can precipitate unexpectedly and can disturb operation of the installations. The problem is particularly sensitive for flash tanks, one obvious problem being massive scaling at the input to one or several pipes (Ti) through which the slurry passes from one flash tank ($D_i$) to the next ($D_{i+1}$). In this case, the series has to be stopped to clean the clogged circuits. This operation in itself is long, difficult and expensive. It also blocks production, which significantly reduces the economic efficiency of the BAYER line.

Patent application FR 1 523 304 (PECHINEY and KESTNER) recommends a process for bauxites with a high calcium carbonate content, in which a fraction of the spent aluminate liquor, drawn off just after crystallisation and treated in a separate workshop including a line of evaporators and a line of flash tanks, is oversaturated with sodium carbonate, such that sodium carbonate will crystallise with the appearance of coarse grains easy to separate from the aluminate liquor. The sodium carbonate is then extracted and caustified by lime after redissolution. Unfortunately, this decarbonation process is very expensive in terms of investment and steam energy.

In French application FR 2 328 660, the applicant proposed a process also adapted to the treatment of bauxites with a high calcium carbonate content ($CaCO_3 > 1.5\%$) such as diasporic bauxites from Greece or China. This process consists of trapping carbonate ions by precipitation of barium carbonate in a fraction of the spent liquor. The barium carbonate is then calcinated in the presence of aluminium trihydroxide $Al(OH)_3$ to generate the barium aluminate that is recycled. This process is effective in eliminating carbonates but has three disadvantages:

- it consumes large quantities of energy; of the order of 20 kg of low sulphur content fuel per tonne of alumina
- it significantly reduces production corresponding to the aluminium trihydrate that must be continuously assigned to the barium aluminate regeneration loop and the quantity of which depends on the content of calcium carbonate in the bauxite
- barium salts create difficult-to-solve environmental and hygiene problems.

Finally, PECHINEY and the SOCIETE DES BAUXITES DU PARNASSE proposed another process for Greek diasporic bauxites. This process consists of grinding the bauxite and then separating the carbonates by flotation and partially eliminating the carbonates before injecting the said bauxite into the Bayer circuit (for example see the article published in TMS 99: "Alumina Production From Diasporic Bauxite" by E. Lavalou, O. Keramindas and B. Bosca). This type of process called "decalcitation" is efficient but it requires the installation of a large auxiliary workshop on the input side of the Bayer installations. The financial depreciation of such an installation increases the manufacturing cost of alumina with this type of bauxites.

PROBLEM THAT ARISES

The applicant attempted to develop an alumina production process according to the Bayer process from bauxites containing alumina monohydrate of the diaspore or boehmite type, the said bauxites possibly containing more than 1.5% by weight of calcium carbonates. This process must not have the economic and environmental disadvantages mentioned above.

SUMMARY OF THE INVENTION

The purpose of the invention is an alumina production process from bauxites containing alumina monohydrate of the diaspore or boehmite type with more than 1.5% by weight of calcium carbonate with the following general steps of a Bayer process:

a) digestion of the ore at a temperature of more than 220° C. using an aluminate liquor with a soda concentration of more than 200 g of $Na_2O$/liter;

b) dilution of the aluminate slurry thus obtained, c) separation of the insoluble residues by settling and filtering, d) crystallisation in the liquor by seeding with aluminium trihydroxide particles in order to cause precipitation of the alumina in solution in the form of aluminum trihydroxide;

e) recycling of the spent sodium aluminate liquor to the bauxite digestion step after having restored an appropriate concentration of the sodium hydroxide, the ore digestion step being carried out as follows:

a1) a slurry, made with ground bauxite ore and concentrated alumina liquor, is transferred into an installation comprising a series of n digesters ($A_1, \ldots, A_{k-1}, A_k, A_{k+1}, \ldots, A_n$) and a series of m flash tanks ($D_1, \ldots, D_{i-1}, D_i, D_{i+1}, \ldots, D_m$), where m is less than n, supplying tubular heaters ($R_m, \ldots, R_{k+1}, R_k, R_{k-1} \ldots, R_l$) with steam passing through m digesters (usually but not necessarily the first m digesters).

a2) the slurry passes firstly through the series of digesters ($A_1, \ldots, A_{k-1}, A_k, A_{k+1}, \ldots, A_n$), the duration of its path and the temperature reached being defined such that ore digestion is practically complete at the exit from the last digester ($A_n$);

a3) the slurry then passes through the series of flash tanks ($D_1, \ldots, D_{i-1}, D_i, D_{i+1}, \ldots, D_m$), the steam Vi output from each flash tank $D_i$ supplying the heater ($R_k$) passing through the digester ($A_k$), a4) the slurry is finally directed towards the dilution station (C) and the settlement workshop (F);

the said process being characterised in that the slurry ($S_i$) entering a flash tank ($D_{i+1}$) is diluted at at least one location along the line of the said flash tanks ($D_1, \ldots, D_{i-1}, D_i, D_{i+1}, \ldots, D_m$), using water derived from condensation of steam originating from one or several upstream flash tanks ($Dl, \ldots, D_i$).

DESCRIPTION OF THE PREFERRED EMBODIMENTS

Figure 1:
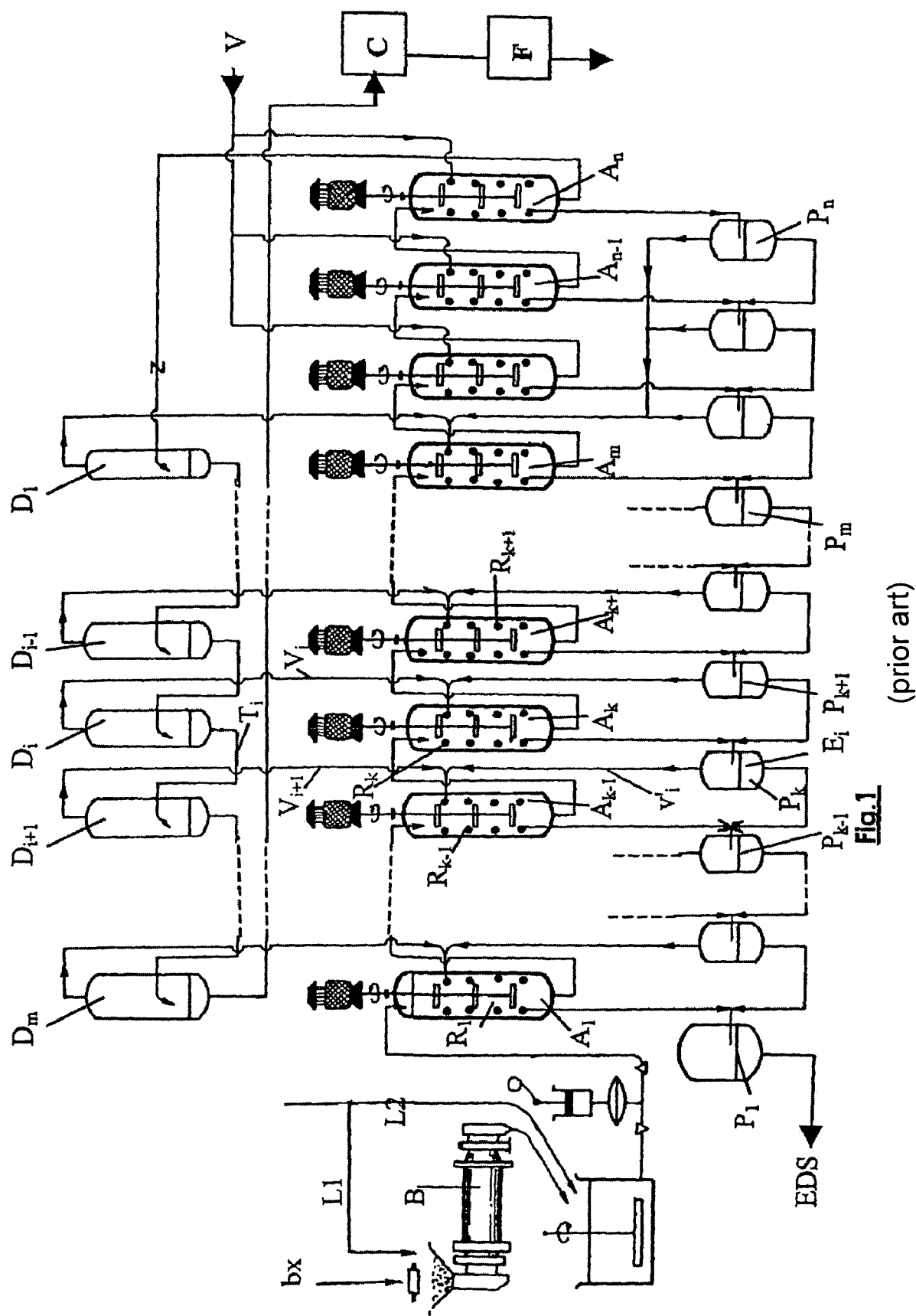
FIG. 1 is a schematic diagram of the installation of a Bayer circuit according to the prior art.

The "at least one location" along the line of flash tanks is preferably the flash tank concerned by massive precipitation of sodium carbonates or part of the pipe through which the slurry passes before arriving in the said flash tank, close to the said flash tank. Therefore, the dilution water is brought directly into the flash tank concerned and/or into the circulation tubing of the slurry on the input side of the flash tank.

The expression "entering a flash tank" means that the dilution may be done either directly in the flash tank with a separate pipe opening up into the flash tank and adding the water necessary for dilution, or by a branch connection made on the pipe in which the slurry is circulating on the input side of the flash tank. In this case, the branch connection is located close to the flash tank such that there is a significant pressure loss between this location and the output from the flash tank immediately upstream, for example corresponding to at least 90% of the total pressure loss between the two flash tanks.

Let ($D_i$) be the flash tank concerned by the unexpected precipitations. According to the invention, the slurry ($S_i$) that is collected in the flash tank ($D_i$) or the slurry ($S_{i-1}$) circulating in the tubing ($T_{i-1}$) to reach the flash tank ($D_i$) is diluted with water originating from one or more condensates originating from the upstream flash tanks. A separate pipe ($G_i$) carries this water either directly into the flash tank ($D_i$) that collects the slurry ($S_i$), or into the tubing ($T_{i-1}$) that carries the slurry ($S_{i-1}$) in the flash tank ($D_i$), the branch connection being located close to the flash tank ($D_i$). These two dilution possibilities may also be used simultaneously.

The applicant thought that instead of attempting to eliminate carbonates at all costs, or at least significantly reducing their concentration by expensive means according to prior art, it might be sufficient to prevent the precipitation of carbonates at sensitive locations, in other words at flash tank outlet tubings. This type of process makes it possible to work with a proportion by weight expressed as the (carbonated $Na_2O$)/(caustic $Na_2O$+carbonated $Na_2O$) ratio more than about 14%. This high content is an equilibrium content; evacuation of carbonates, sufficient to prevent their accumulation, is possible during extraction of solid residues. While this is a slight drawback (particularly concerning productivity), it does not prevent efficient operation of the Bayer process, provided that the unexpected precipitation of sodium carbonate and possibly other salts, particularly based on sulphur, fluorine, phosphorus, arsenic and/or vanadium, such as vanadates, fluoro-arsenio-vanadates, etc., can be prevented.

For example FR 1 386 328 (PECHINEY) or FR 1 523 304 patent applications show that the solubility of carbonates reduces with the caustic concentration of the liquor. Therefore, it is not surprising that the dilution provides a means of avoiding the precipitation of carbonates. However, the addition of water into the Bayer circuit is not particularly desirable for economic reasons since this addition necessarily degrades the energy balance; either more energy has to be consumed to evaporate the water added in this way, or if water is taken out of the circuit itself, then it must be acceptable to work with a much lower quantity of mud washing water (which results in an increased soda loss). The solution according to the invention is different from solutions according to prior art, which have all chosen the opposite approach; to concentrate the liquor at a precise location in the Bayer circuit, this location being chosen to obtain a controlled precipitation of impurities.

Moreover, the addition of water at such a location introduces a certain risk since in a way it consists of a premature dilution that anticipates the planned dilution before settlement and can cause reversion, in other words premature precipitation of trihydrate in settlement tanks. In fact, surprisingly, tests carried out by the applicant show that reversion risks are not significantly higher when limited dilution is done in a flash tank.

Therefore, the invention consists of diluting the slurry to prevent the precipitation of carbonates; the slurry ($S_{i-1}$) entering the flash tank ($D_i$), or the slurry ($S_i$) collected in the flash tank ($D_i$) is diluted with water output from the condensation of steam originating from one or several upstream flash tanks ($D_l, \ldots, D_{i-1}$). Preferably, water derived from condensation of steam ($V_{i-2}$) originating from the upstream flash tank ($D_{i-2}$) is used.

In one preferred embodiment of the invention, a system for collection of water from the condensation of steam derived from flash tanks and passing through the heaters installed in the digesters, is used. This water called alkaline condensate, is collected in purge pots, one purge pot ($P_k$) collecting firstly water from upstream purge pots ($P_m, \ldots, P_{k+1}$) and secondly the condensate ($E_i$) of steam ($V_i$) output from flash tank ($D_i$).

Preferably, the water that will be used to dilute the slurry ($S_i$) collected in a flash tank ($D_i$) and/or the slurry ($S_{i-1}$) entering the flash tank ($D_i$) is drawn off at the output from the purge pot ($P_{k+2}$). It is carried through a pipe ($G_i$) either directly into the flash tank ($D_i$) (duct $g_{ia}$), or into the pipe ($T_{i-1}$) through which the slurry ($S_{i-1}$) circulates on the upstream side of the flash tank ($D_i$) (duct $g_{ib}$).

Similarly, temperature differences between the slurry and the water that will be diluted are minimum, which facilitates maintaining the carbonates in a stable dissolved state. The "water" balance is not affected very much; admittedly, less water exits from the purge pot circuit (distilled soda water) but water is taken from the circuit itself and is re-added fairly quickly, in a downstream flash tank, anticipating some of the dilution performed on the downstream side of the last flash tank (station C) and that will control the required caustic concentration of the slurry at the inlet to the first settlement tank (workshop F). Therefore, this reduces water consumption at the dilution station (C), the water thus saved possibly for example being used to compensate for the smaller addition of distilled soda water to the mud washing water. This also reduces soda consumption since soda entrained by the flash steam is evacuated in smaller quantities with the condensates used for washing mud.

It is preferred to use condensate from the second flash tank upstream for dilution, since the pressure in the pot that collects the condensate from the flash tank directly on the upstream side is approximately equal to the pressure in the flash tank concerned, such that the addition of water originating from the pot that collects the condensate from the flash tank directly on the input side needs to be assisted by the use of an additional pump.

Moreover, diluting with alkaline condensates consisting of recycled process hot water, provides a means of improving the thermal efficiency with respect to a dilution that would be made with water which would require an additional energy cost for specific heating.

Since the massive carbonate precipitation phenomenon occurs within a narrow temperature range, in principle a single flash tank should be concerned. However, normal variations of control parameters of industrial installations, variations of the carbonate content of the bauxite being treated and possibly frequent modifications imposed in the supply of bauxites, and possibly the precipitation of other salts at different temperatures that could concern other flash tanks, are all reasons for providing as many means of diluting the slurry as possible, the best method being to provide dilution at the input to every flash tank. This dilution is preferably made with the condensate from the second flash tank upstream.

Moreover, the fact of recycling alkaline condensates at several locations provides a means of minimising energy consumption. By recycling the said alkaline condensates that is at a temperature close to the temperature of the slurry to be diluted, the result is to act on a medium that is close to the state of thermodynamic reversibility since large temperature differences between the fluids present are avoided. As the number of dilution points increases, the phenomenon becomes closer to perfect reversibility and the energy consumption becomes lower. Thus, the necessary quantity of water is injected in a maximum number of flash tanks.

Therefore, preferably each outlet tubing from a purge pot ($P_{k+2}$) is equipped with a branch connection ($G_i$) through which part of the water thus drawn off may be used to dilute the slurry ($S_i$) collected in the flash tank ($D_i$) or the slurry ($S_{i-1}$) entering the flash tank ($D_i$). Moreover, a valve fitted on each branch connection ($G_i$) can be used to control the flow of dilution water; sufficiently dilution water is necessary to prevent precipitation of carbonates, but too much should be avoided to prevent extra energy losses and possibly reversion.

A large number of pipes (Gi) is particularly desirable if several other salts (based on sulphur, fluorine, phosphorus, arsenic and/or vanadium such as vanadates, fluoro-arsenio-vanadates, etc.) are likely to precipitate suddenly and unexpectedly in the flash tank circuit, but each within a distinct temperature range corresponding to a specific flash tank, which may be different from the flash tank concerned by precipitation of carbonates. It is thus easier to control the risk of precipitation of each of these salts separately.

Finally, and economically, the installation of one or several additional pipes results in a negligible extra investment cost, incomparably lower than the cost of equipment envisaged in prior art (barium carbonate precipitation line and recycling of barium aluminate, bauxite decalcitation workshop).

The quantity of water used to dilute the slurry to prevent a massive precipitation of carbonates and other salts may be determined precisely from solubility curves for these salts, particularly form carbonates.

Figure 3:
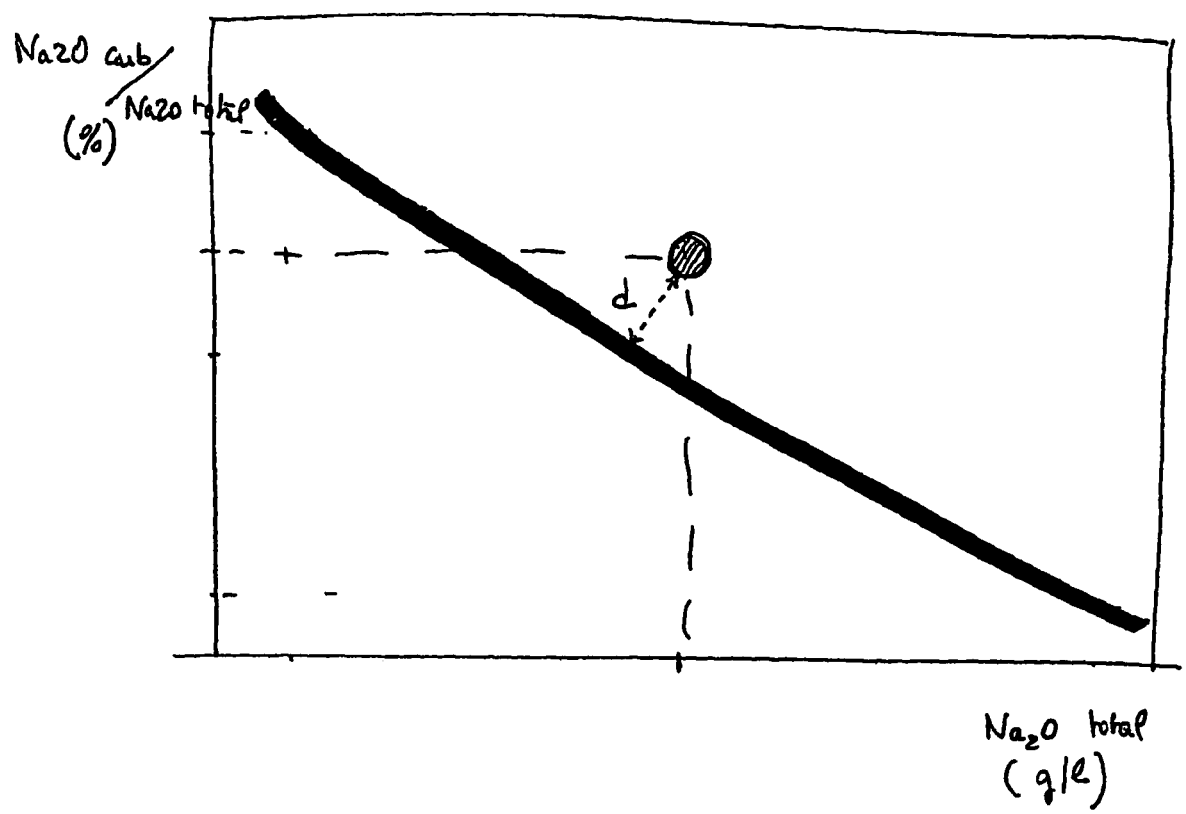
FIG. 3 is a graph of the limiting concentration of carbonates vs. concentration of caustic in a Bayer liquor.

FIG. 3 illustrates a diagrammatic curve as an example, showing the limiting concentration at a given temperature of carbonates expressed in terms of carbonated soda (carbonated Na2O), varying as a function of the caustic concentration of the liquor. The water quantity necessary for dilution is approximately proportional to the distance between the said curve and the operating point at the location of the flash circuit considered.

Thus, for any pipe $G_i$, it is possible to add water to dilute the slurry with a flow determined as a function of the temperature and the carbonate concentration in the slurry reaching the inlet to the flash tank considered, by adjusting the valve installed on the said pipe.

Figure 2:
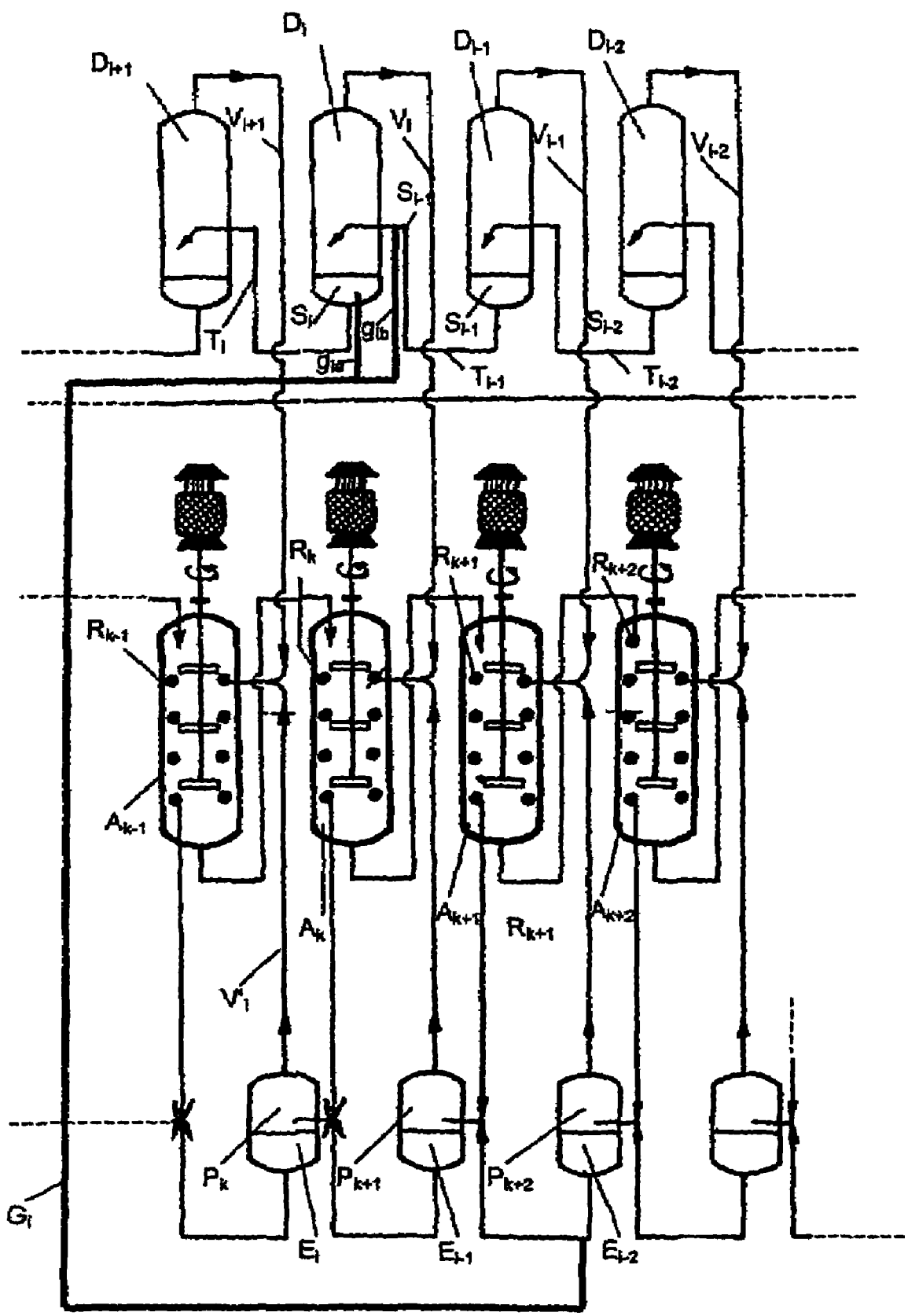
FIG. 2 is a schematic diagram of a section of a Bayer installation according to the invention.

In the following embodiment, dilution according to the invention is made in a conventional digestion installation as shown in FIG. 1, where n=19 and m=12. The dilution is made using a pipe $G_i$ connecting purge pot $P_{k+2}$ with the flash tank $D_i$, shown schematically in FIG. 2, where i=9 and k=4.

In this example, the diasporic bauxite to be treated is a Chinese bauxite containing 4.3% of calcium carbonates.

The continuous digestion workshop comprises 19 digesters and 12 flash tanks. The slurry output from the last digester is at 265° C. at 50 bars.

Without the bypass according to the invention, fast clogging of flash tank D9 occurs. The circuit tends to get blocked after a few days of operation at a point in the circuit at which the solution temperature is approximately 150° C.

If there is no dilution, the caustic concentration of slurry S8 at the inlet to flash tank D9, is 260 g/l expressed in total Na2O and the carbonate content expressed as (carb Na2O/total Na2O) is equal to 14%. The corresponding operating point is remote from the solubilisation curve in FIG. 3 and the distance d from this point to the solubilisation curve indicates that slurry S8 circulating at a flow rate of 375 m3/h will have to be diluted with a flow rate of 10 m3/h at the entry to flash tank D9 to prevent the precipitation of carbonates at this location, particularly at the exit from flash tank D9.

If water drawn from the outside is used for dilution at a temperature 150° C., precipitation is prevented but there is an energy increase of the order of 133 MJ/t of alumina produced.

However, if some of the water output from purge pot P6 is drawn off, itself supplied by water output from upstream purge pots P12 to P7 and steam condensate V7 output from upstream flash tank D7 to pass through heater R6 of digester A6. This water is injected through pipe G9 at a flow rate of 10 m³/h into slurry S8 circulating in tubing T8, the branch connection of pipe $g_{9b}$ in tubing T8 being located close to the inlet into flash tank D9 (approximately 100 mm).

It is found that massive scaling no longer occurs in the tubings at the exit from flash tank D9.

ADVANTAGES possibility of preventing precipitation of other salts
particularly attractive for diasporic bauxites already containing carbonates, this process can be used for other types of bauxites, knowing that the general trend in the Bayer process is to increase the caustic concentration of aluminate liquor in order to improve productivity and that the control of the Bayer process will increasingly be affected by problems of unexpected precipitations of carbonates (vanadates and other salts described above) caused by their lower solubility in these media.

The invention claimed is:

1. Alumina production process from bauxite containing a diaspore or boehmite alumina monohydrate with more than 1.5% by weight of calcium carbonate, comprising the steps of:

a) digesting the ore at a temperature of more than 220° C. using an aluminate liquor with a soda concentration of more than 200 g of $Na_2O$/liter;

b) diluting the aluminate slurry thus obtained;

c) separating insoluble residues obtained by settling and filtering;

d) crystallizing the liquor by seeding with aluminum trihydroxide particles in order to cause precipitation of alumina in solution in the form of aluminum trihydroxide, to obtain thereby a spent liquor; and e) restoring the soda concentration of the spent liquor and recycling the spent liquor to the bauxite digestion step;

wherein the ore digestion step comprises the steps of:

a1) transferring the slurry comprising ground bauxite ore and concentrated alumina liquor to an installation comprising a series of n digesters ($A_1, \ldots, A_{k-1}, A_k, A_{k+1}, \ldots, A_n$) and a series of m flash tanks ($D_1, \ldots, D_{i-1}, D_i, D_{i+1}, \ldots, D_m$), where m is less than n, while supplying tubular heaters ($R_m, \ldots, R_{k+1}, R_k, R_{k-1}, \ldots, R_i$) with steam passing through m digesters;

a2) passing the slurry first through the series of digesters ($A_1, \ldots, A_{k-1}, A_k, A_{k+1}, \ldots, A_n$), with a duration defined such that ore digestion is substantially complete at upon exit from final digester ($A_n$);

a3) passing the slurry through the series of flash tanks ($D_1, \ldots, D_{i-1}, D_i, D_{i+1}, \ldots, D_m$), the steam (Vi) output from each flash tank ($D_i$) supplying the heater ($R_k$) passing through the digester ($A_k$); and a4) directing the slurry to stations for said dilution (C) and said separating (F);

and wherein the slurry ($S_{i-1}$) entering a flash tank ($D_i$) is diluted in at least one location in series of said flash tanks ($D_1, \ldots, D_{i-1}, D_i, D_{i+1}, \ldots, D_m$), using water obtained from condensation of steam originating from at least one upstream flash tank ($D_1, \ldots, D_{i+1}$).

2. Process according to claim 1, wherein at least one of the slurry ($S_{i-1}$) entering a flash tank ($D_i$) and the slurry ($S_i$) collected in the flash tank ($D_i$) is diluted using water derived from condensation of steam originating from an upstream flash tank ($D_{i-2}$).

3. Process according to claim 2, wherein dilution water is drawn off at the output from the purge pot ($P_{k+2}$) that collects the condensate ($E_{i-2}$) from the steam ($V_{i-2}$) derived from the flash tank ($D_{i-2}$) and is inserted in the slurry ($S_i$) using a pipe ($G_i$) that connects the output pipe from the purge pot ($P_{k+2}$) to the flash tank ($D_i$).

4. Process according to claim 3, wherein the purge pot ($P_{k+2}$) also collects water from upstream purge pots ($P_{k+3}, \ldots, P_m$).

5. Process according to claim 3, wherein a pipe ($G_i$) connects the output pipe from each purge pot ($P_{k+2}$) to each flash tank ($D_i$).

6. Process according to claim 2, wherein dilution water is drawn off at the output from the purge pot ($P_{k+2}$) that collects the condensate ($E_{i-2}$) from the steam ($V_{i-2}$) derived from the flash tank ($D_{i-2}$) and is inserted in the slurry ($S_{i-1}$) using a pipe ($G_i$) that connects the output pipe from the purge pot ($P_{k+2}$) to the pipe ($T_{i-1}$) through which the slurry ($S_{i-1}$) circulates, through a branch connection located adjacent to the flash tank ($D_i$).

7. Process according to claim 1, wherein dilution water flow is determined using a predetermined solubilization curve.

8. Process according to claim 7, wherein the dilution water flow is controlled using a valve installed on the pipe ($G_i$).

* * * * *